(12) United States Patent
Sturm et al.

(10) Patent No.: US 9,512,939 B2
(45) Date of Patent: Dec. 6, 2016

(54) METHOD OF LAYING A PIPELINE

(71) Applicant: Heerema Marine Contractors Nederland SE, Leiden (NL)

(72) Inventors: Noortje Willemein Maria Sturm, Leiden (NL); Eduard Wiersema, Leiden (NL); Cornelis van Zandwijk, Leiden (NL)

(73) Assignee: HEEREMA MARINE CONTRACTORS NEDERLAND SE, Leiden (NL)

( * ) Notice: Subject to any disclaimer, the term of this patent is extended or adjusted under 35 U.S.C. 154(b) by 103 days.

(21) Appl. No.: 14/400,452

(22) PCT Filed: May 13, 2013

(86) PCT No.: PCT/NL2013/050354
§ 371 (c)(1),
(2) Date: Nov. 11, 2014

(87) PCT Pub. No.: WO2013/172706
PCT Pub. Date: Nov. 21, 2013

(65) Prior Publication Data
US 2015/0125217 A1    May 7, 2015

Related U.S. Application Data

(60) Provisional application No. 61/647,577, filed on May 16, 2012.

(30) Foreign Application Priority Data

May 16, 2012   (NL) ...................................... 2008830

(51) Int. Cl.
*F16L 1/12*   (2006.01)
*F16L 1/20*   (2006.01)
(Continued)

(52) U.S. Cl.
CPC .................. *F16L 1/205* (2013.01); *F16L 1/12* (2013.01); *F16L 1/18* (2013.01); *F16L 1/203* (2013.01); *F16L 1/207* (2013.01); *F16L 1/23* (2013.01); *F16L 1/235* (2013.01)

(58) Field of Classification Search
CPC .......... B63B 35/03; F16L 1/12; F16L 1/161; F16L 1/18; F16L 1/203; F16L 1/205; F16L 1/207
See application file for complete search history.

(56) References Cited

U.S. PATENT DOCUMENTS 6,004,071 A * 12/1999 Broeder .................. F16L 1/202
                                                    405/166
6,149,347 A * 11/2000 Scott ........................ F16L 1/19
                                                    405/158

(Continued)

OTHER PUBLICATIONS

Search Report and Written Opinion dated Jun. 18, 2013 for International Application No. PCT/NL2013/050354.

(Continued)

*Primary Examiner* — Benjamin Fiorello
(74) *Attorney, Agent, or Firm* — Patterson & Sheridan, L.L.P.

(57) ABSTRACT

A method of laying a pipeline (100) on a seabed (9), said method comprising the steps of; constructing a section of pipeline (6) by interconnecting pipe sections (31), positioning the section of pipeline on an underwater storage surface (74), and recovering the section of pipeline from the under water storage surface and spooling the section of pipeline on a reel (2) provided on a vessel (15).

21 Claims, 9 Drawing Sheets

(51) Int. Cl.
*F16L 1/18* (2006.01)
*F16L 1/23* (2006.01)
*F16L 1/235* (2006.01)

(56) References Cited

U.S. PATENT DOCUMENTS

| | | | |
|---|---|---|---|
| 6,702,519 B2* | 3/2004 | Stockstill | B63B 35/03 |
| | | | 405/166 |
| 8,998,533 B2* | 4/2015 | Scaini | F16L 1/207 |
| | | | 405/158 |
| 2003/0091395 A1* | 5/2003 | Stockstill | B63B 35/03 |
| | | | 405/154.1 |
| 2010/0034591 A1 | 2/2010 | Wilson | |
| 2010/0294871 A1 | 11/2010 | Buijvoets | |

OTHER PUBLICATIONS

Search Report and Written Opinion dated Mar. 5, 2013 for Netherland Application No. NL2008830.

* cited by examiner

--PRIOR ART--

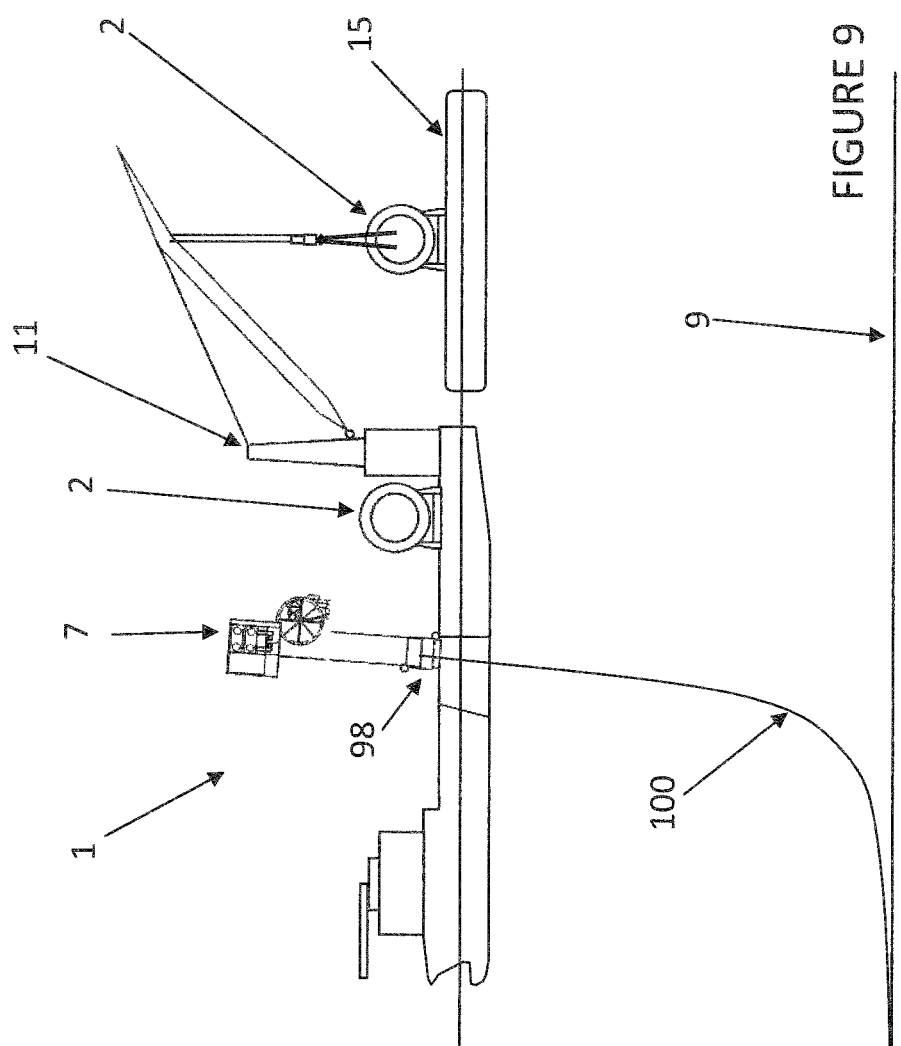

METHOD OF LAYING A PIPELINE

CROSS-REFERENCE TO RELATED APPLICATIONS

This application is the National Stage of International Application No. PCT/NL2013/050354, filed May 13, 2013, which claims benefit of Netherlands Patent Application No. 2008830, filed May 16, 2012, and which claims benefit of U.S. Provisional Application No. 61/647,577, filed May 16, 2012.

BACKGROUND

Field

The invention relates to a method of laying a pipeline on a seabed, said method comprising the steps of;
  constructing a section of pipeline by interconnecting pipe sections,
  positioning the section of pipeline on an underwater storage surface, and
  recovering the section of pipeline from the under water storage surface and spooling the section of pipeline on a reel provided on a vessel.

Description of the Related Art

The use of the underwater storage surface makes it possible to construct and store very long sections of pipeline, with for example a length up to several kilometers or more. There are many shallow waters wherein the seabed can serve as a very large naturally formed underwater storage surface. The length of the stored sections of pipeline may be made equal to the maximum length that can be held by the reel, so that it is not required to interconnect sections of pipeline when filling the reel. This eliminates the time required to make interconnections of sections of pipeline when filling the reel. In the situations that interconnections of sections of pipeline are required to fill the reel, the number of interconnections are reduced by the long sections of pipeline. Due to this, less time is required to fill the reel, which results in cost savings.

Due to the use of the underwater storage surface, it is not required to have an large on-shore storage area. Such large storage areas are very expensive to build and there are not many locations suitable for such a large storage area.

SUMMARY

In an embodiment, the method comprises transporting the reel holding the section of pipeline to an off-shore location where the section of pipeline is lowered to the seabed. The method may comprise before transporting the reel to the off-shore location constructing a further section of pipeline and positioning the further section of pipeline on the underwater storage surface, recovering the further section of pipeline from the underwater storage surface, connecting the further section of pipeline to the spooled section of pipeline and spooling the further section of pipeline on the reel, and wherein the interconnected section of pipeline and further section of pipeline at the off-shore location are lowered to the seabed.

In an embodiment, the method comprises transporting the reel holding the section of pipeline to an off-shore location where a free end of the pipeline is located, connecting the section of pipeline to the free end of the pipeline, and lowering the interconnected section of pipeline and pipeline to the seabed. The method may comprise before transporting the reel to the off-shore location constructing a further section of pipeline and positioning the further section of pipeline on the underwater storage surface, recovering the further section of pipeline from the underwater storage surface, connecting the further section of pipeline to the spooled section of pipeline and spooling the further section of pipeline on the reel, and wherein the interconnected section of pipeline and further section of pipeline at the off-shore location are connected to the free end of the pipeline and lowered to the seabed.

In an embodiment of the method, the length of the constructed section of pipeline is equal to the maximum length that can be held by the reel.

In an embodiment of the method, the section of pipeline is positioned on the underwater storage surface to temporarily store the section of pipeline.

In an embodiment, the method comprises lowering the section of pipeline to the seabed by unspooling the section of pipeline from the reel.

In an embodiment, the method comprises transporting the reel holding the section of pipeline from the underwater storage surface to the off-shore location with the vessel.

In an embodiment, the method comprises constructing the section of pipeline with a pipeline construction vessel.

In an embodiment, the method comprises positioning the section of pipeline on the underwater storage surface with the pipeline construction vessel.

In an embodiment of the method, the pipeline construction vessel is constructed and arranged to position the constructed section of pipeline on the underwater storage surface.

In an embodiment of the method, the pipeline construction vessel comprises a pipeline guide to guide the section of pipeline to the underwater storage surface.

In an embodiment of the method, the pipeline guide is an S-lay stinger.

In an embodiment, the method comprises constructing the section of pipeline and positioning the section of pipeline on the underwater storage surface by an S-lay procedure.

In an embodiment of the method, the pipeline construction vessel is an S-lay vessel.

In an embodiment, the method comprises transferring the reel holding the section of pipeline from the vessel to a pipeline laying vessel and lowering the section of pipeline to the seabed with the pipeline laying vessel.

In an embodiment of the method, the transferring of the reel holding the section of pipeline is performed by lifting said reel with a crane.

In an embodiment of the method, the crane is provided on the vessel.

In an embodiment of the method, the crane is provided on the pipeline laying vessel.

In an embodiment of the method, the transferring of the reel holding the section of pipeline is performed by a reel guiding system extending between the vessel and the pipeline laying vessel.

In an embodiment, the method comprises transferring the section of pipeline from the vessel to a pipeline laying vessel and lowering the section of pipeline to the seabed with the pipeline laying vessel.

In an embodiment of the method, the transferring of the section of pipeline is performed by spooling said section of pipeline from the reel of the vessel onto a further reel provided on the pipeline laying vessel.

In an embodiment, the method comprises lowering the section of pipeline to the seabed while unreeling the further reel.

In an embodiment, the method comprises lowering the section of pipeline to the seabed with a pipeline laying vessel.

In an embodiment, the method comprises lowering the section of pipeline to the seabed by a reel-lay procedure.

In an embodiment of the method, the pipeline laying vessel is a reel-lay vessel.

In an embodiment of the method, the vessel is a transport vessel.

In an embodiment of the method, the transport vessel is a cargo barge.

In an embodiment of the method, the transport vessel is a self-propelled vessel.

In an embodiment of the method, the vessel is a pipeline laying vessel.

In an embodiment of the method, the pipeline laying vessel comprises at least one fixed reel.

In an embodiment, the method comprises transporting the reel holding the section of pipeline from the underwater storage surface to the off-shore location with the pipeline laying vessel.

In an embodiment of the method, the pipeline laying vessel comprises at least one removable reel.

In an embodiment of the method, the section of pipeline comprises a first end and a second end, the first end is constructed before the second end, and the method comprises providing a connector located in a fixed position relative to the underwater storage surface and connecting the first end of the section of pipeline to the connector.

In an embodiment of the method, the first end is connected to the connector during the construction of the section of the pipeline.

In an embodiment of the method, the first end is connected to the connector during the period that the section of the pipeline is positioned on the underwater storage surface.

In an embodiment of the method, the first end is connected to the connector during the recovery of the section of pipeline from the under water storage surface and the spooling of the section of pipeline on the reel.

In an embodiment of the method, the connector is located on the underwater storage surface.

In an embodiment of the method, the connector is located on a quay.

In an embodiment of the method, multiple sections of pipeline are connected to one connector.

In an embodiment, the method comprises watertight sealing the first end and second end such that the inside of the section of pipeline is not filled with liquid when positioned on the underwater storage surface. In an embodiment, the method comprises connecting a buoy to the second end.

In an embodiment of the method, the second end is recovered from the underwater storage surface and spooled on the reel before the first end.

BRIEF DESCRIPTION OF THE DRAWINGS

Embodiments of the method will be described by way of example only, with reference to the accompanying schematic drawings in which corresponding reference symbols indicate corresponding parts, and in which.

DETAILED DESCRIPTION

Figure 1:
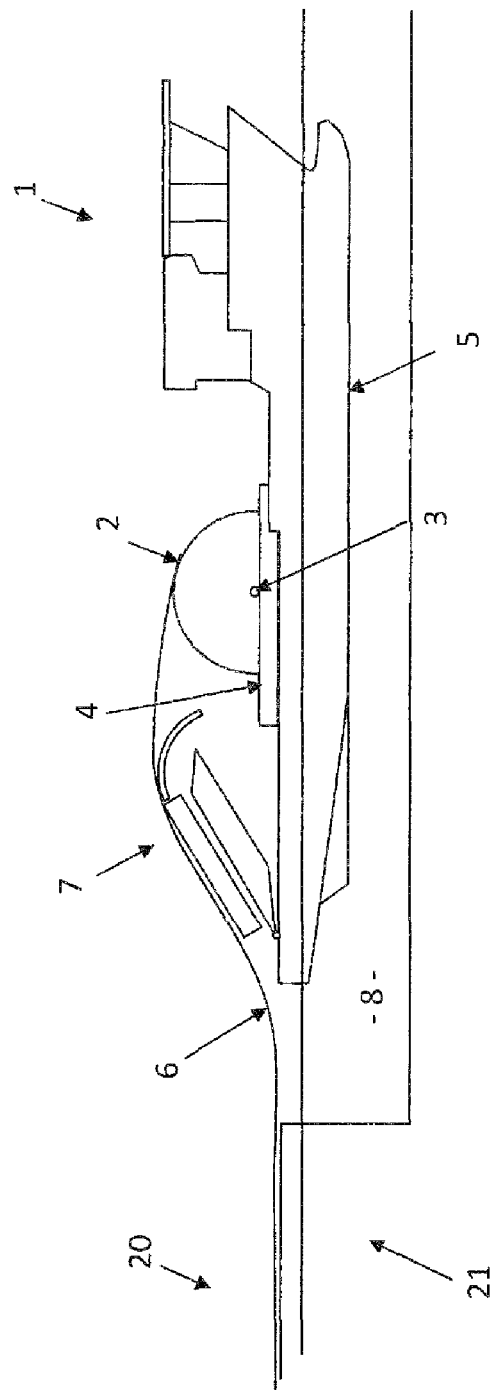
FIG. 1 schematically shows a first method known in the art.

FIG. 1 shows a side view of a first method known in the art. A pipeline laying vessel 1 is floating on water 8. The pipeline laying vessel 1 comprises a reel 2. The reel 2 is rotatable via a reel axle 3. The reel axle 3 is fixedly connected to the hull 5 of the pipeline laying vessel 1 via a support structure 4. A section of pipeline 6 is spooled on the reel 2 at a spoolbase 20 located on a quay 21. The section of pipeline 6 is constructed by interconnecting pipe sections at the spoolbase 20.

After the section of pipeline 6 is spooled on the reel 2, the pipeline laying vessel 1 sails to an off-shore location where the section of pipeline 6 needs to be installed or where a free end of the pipeline which is being laid is located. The section of pipeline 6 is lowered to the seabed or first connected to the free end of the pipeline and subsequently lowered to the seabed via a pipelay ramp 7 provided on the pipeline laying vessel 1.

Once the section of pipeline 6 has been lowered to the seabed, it forms part of the pipeline. After that, the pipeline laying vessel 1 sails back to the spoolbase 20 for re-filling the reel 2 with a new section of pipeline 6.

As a result the expensive pipeline laying vessel 1 is only part of its time effectively deploying pipeline to the seabed, the majority of time being spent on sailing to the spoolbase 20, re-filling the reel 2 and sailing back to the free end of the pipeline. The farther away the spoolbase 20 from the free end of the pipeline, the less the effective time spent on deploying pipeline to the seabed 9.

Figure 2:
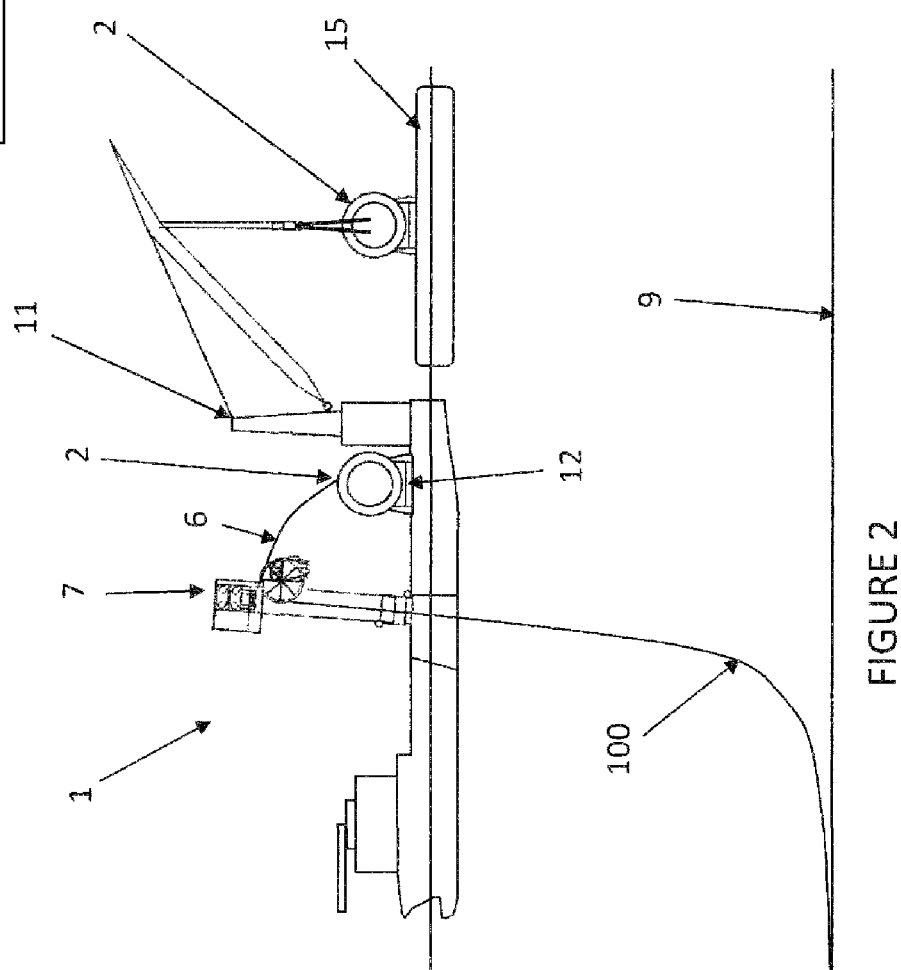
FIG. 2 schematically shows a second method known in the art.

FIG. 2 shows a side view of a second method known in the art. In the method removable reels 2 are use. A pipeline laying vessel 1 is provided with a pipelay ramp 7, a crane 11 and a reel support 12. A section of pipeline 6 is spooled on the reels 2 at a spoolbase 20. Said reel 2 is transported from the spoolbase 20 to the pipeline laying vessel 1 using a transport vessel 15. At the pipeline laying vessel 1, the reel 2 is lifted onto the pipeline laying vessel 1 using the crane 11. The reel 2 is placed in the reel support 12.

For reeling the section of pipeline 6 from the reel 2 to the seabed 9, the section of pipeline 6 is led through the pipelay tower 7, connected to the free end of the pipeline 100 and lowered to the seabed 9 while being unreeled from the reel 2. Once the section of pipeline 6 is lowered to the seabed 9, it forms part of the pipeline 100. The empty reel 2 is subsequently removed from the reel support 12 by the crane 11.

A new reel 2 holding a new section of pipeline 6 is placed in the reel support 12. Said new section of pipeline 6 is connected to the pipeline 100 and lowered to the seabed 9. These steps are repeated until the pipeline 100 has the required length.

In some situations it is possible that the complete pipeline 100 can be laid by using only one section of pipeline 6. Is said situations, it is not required to interconnect sections of pipeline 6 to form the pipeline 100. The pipeline 100 is laid by lowering a single section of pipeline 6 to the seabed 9.

In other examples, multiple reels 2 each holding a section of pipeline 6 are transported and transferred at the same time to the pipeline laying vessel 1. In said examples, the pipeline laying vessel 1 is configured to handle multiple removable reels 2

Figure 3:
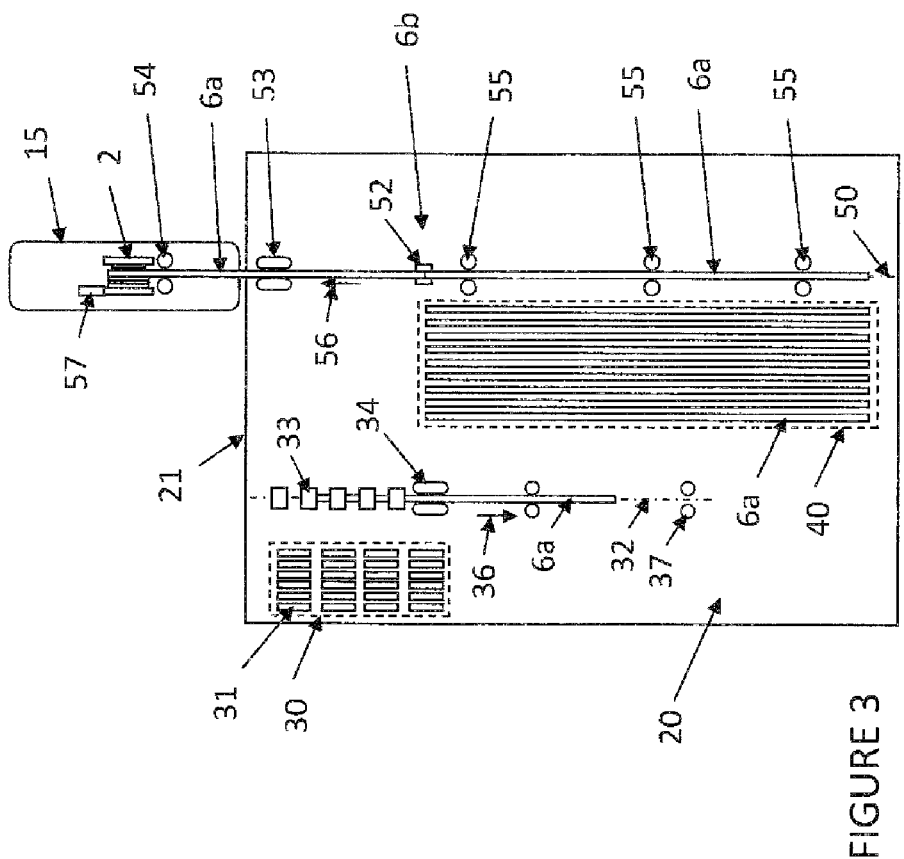
FIG. 3 schematically shows a spoolbase process, and the FIGS. 4-9 schematically show an embodiment of the method according the invention.

FIG. 3 shows a conventional spoolbase process. A spoolbase 20 is usually located near a quayside 21 to which a vessel 15 with a reel 2 can be moored for spooling on a new section of pipeline 6. The vessel 15 can be a pipeline lay vessel with a fixed or removable reel 2 or a transport vessel provided with a removable reel 2.

At the spoolbase 20, pipe sections 31 are stored in a pipe section storage area 30. The pipe sections 31 are most times about 40 foot (12.2 m) length, but can also be another length. From the pipe section storage area 30, pipe sections 31 are transferred to a pipeline preassembly firing line 32 which may comprise a number of work stations 33 at mutual distances equal to the length of the standard pipe sections 31, pipe moving devices 34 and pipe guidance and support means 37. In each work station 33, a part of the process for constructing a section of pipeline 6a is carried out, comprising; lining up the new pipe section 31 with the section of pipeline 6a under construction; welding the pipe section 31 to the section of pipeline 6a under construction; inspecting the completed weld; and coating the weld zone. Pipe moving devices 34 are moving the section of pipeline 6a forward in the direction of arrow 36 until the section of pipeline 6a has the required length, which in general is between 500 and 2000 meter. The sections of pipeline 6a are stored into a storage area 40.

For spooling a section of pipeline 6 on to a reel 2, a vessel 15 carrying the reel 2 is lined up with a spooling firing line 50. The spooling firing line 50 may consist of; a tie-in station 52; a back-tensioning device 53; a pipe fleeting device 54; and pipe guidance and support means 55. For constructing a longer section of pipeline 6b spooled on the reel 2, sections of pipeline 6a which are stored in the storage area 40 are interconnected.

A section of pipeline 6a is spooled on the reel 2 until its tail end is held in the tie-in station 52. Another section of pipeline 6a is brought from the storage area 40 into the firing line 50 and joined with the spooled section of pipeline 6a. The joining process consists of; lining up the sections of pipeline 6a; welding the sections of pipeline 6a to form a longer section of pipeline 6b; inspecting the completed weld; and coating the weld zone. After the connection is completed, the newly formed section of pipeline 6b is pulled forward in the direction of arrow 56 over the length of the section of pipeline 6a just joined to the spooled section of pipeline 6a, using the reel drive unit 57 and the back-tensioning device 53 for moving the section of pipeline 6b; the pipe guidance and support means 55 for guiding and supporting the section of pipeline 6b when it moves forward; and the pipe fleeting device 54 for forming an orderly coil on the reel 2.

After the tail end of the section of pipeline 6b has reached the tie-in station 52, a new section of pipeline 6a stored in the storage area 40 is loaded into the firing line 50 and the joining process repeated until the newly formed section of pipeline 6b has the required length.

When a pipeline laying vessel 1 with a fixed reel (as for example shown in FIG. 1) is used, filling the reel 2 in a short time period is important, as the time for filling the reel 2 is unproductive time for the pipeline laying vessel 1.

When a transport vessel 15 with a removable reel (as for example shown in FIG. 2) is used, filling the reel 2 in a short time period is important to reduce the number of reels 2 and/or transport vessels 15 shuttling between the spoolbase 20 and the pipeline laying vessel 1.

The time needed for filling the reel 2 is for a large part governed by the number of sections of pipeline 6a and the time for interconnecting said sections of pipeline 6a. The time for filling the reel 2 can be reduced by reducing the number of interconnections of sections of pipeline 6a by making them very long, typically 500 to 2000 meters or even longer. Storage of such long sections of pipeline 6a asks for an equally long storage area 40 which makes a spoolbase 20 very expensive and it can be difficult to find a suitable location for it.

The FIGS. 4-9 show an embodiment of the method according the invention. The method of laying a pipeline on a seabed comprises the steps of;

constructing a section of pipeline 6 by interconnecting pipe sections 31, positioning the section of pipeline 6 on an underwater storage surface 74, and recovering the section of pipeline 6 from the under water storage surface 74 and spooling the section of pipeline 6 on a reel 2 provided on a vessel 15.

In one example, the reel 2 holding the section of pipeline 6 is transported to an off-shore location where the section of pipeline 6 is lowered to the seabed 9. In said situation, the method may comprise before transporting the reel 2 to the off-shore location constructing a further section of pipeline 6 and positioning the further section of pipeline 6 on the underwater storage surface 74, recovering the further section of pipeline 6 from the underwater storage surface 74, connecting the further section of pipeline 6 to the spooled section of pipeline 6 and spooling the further section of pipeline 6 on the reel 2, and wherein the interconnected section of pipeline 6 and further section of pipeline 6 at the off-shore location are lowered to the seabed 9.

In a further example, the reel 2 holding the section of pipeline 6 is transported to an off-shore location where a free end 98 of the pipeline 100 is located, the section of pipeline 6 is connected to the free end 98 of the pipeline 6, and the interconnected section of pipeline 6 and pipeline 100 are lowered to the seabed 9. In said situation, the method may comprise before transporting the reel 2 to the off-shore location constructing a further section of pipeline 6 and positioning the further section of pipeline 6 on the underwater storage surface 74, recovering the further section of pipeline 6 from the underwater storage surface 74, connecting the further section of pipeline 6 to the spooled section of pipeline 6 and spooling the further section of pipeline 6 on the reel 2, and wherein the interconnected section of pipeline 6 and further section of pipeline 6 at the off-shore location are connected to the free end 98 of the pipeline 100 and lowered to the seabed 9.

Figure 4:
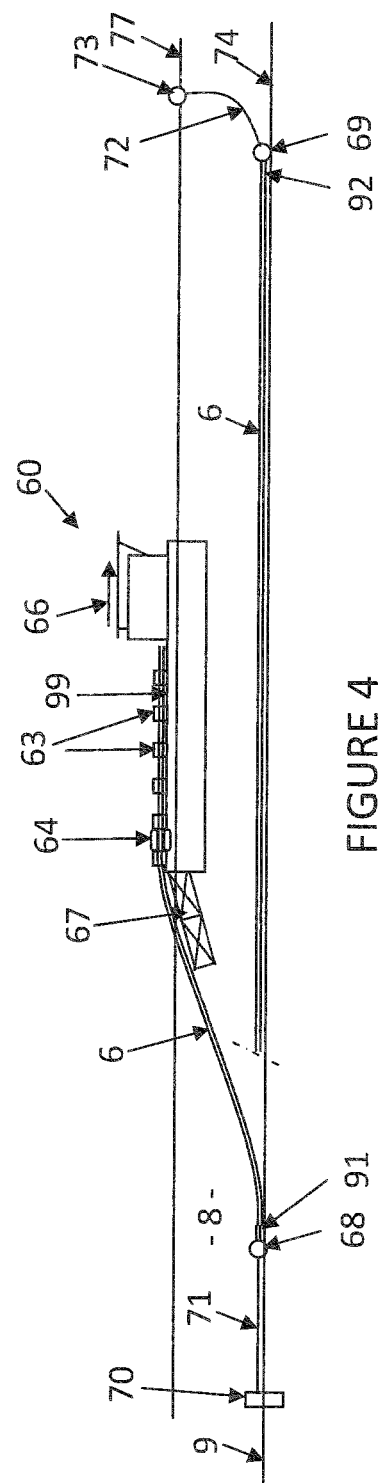
Figure 5:
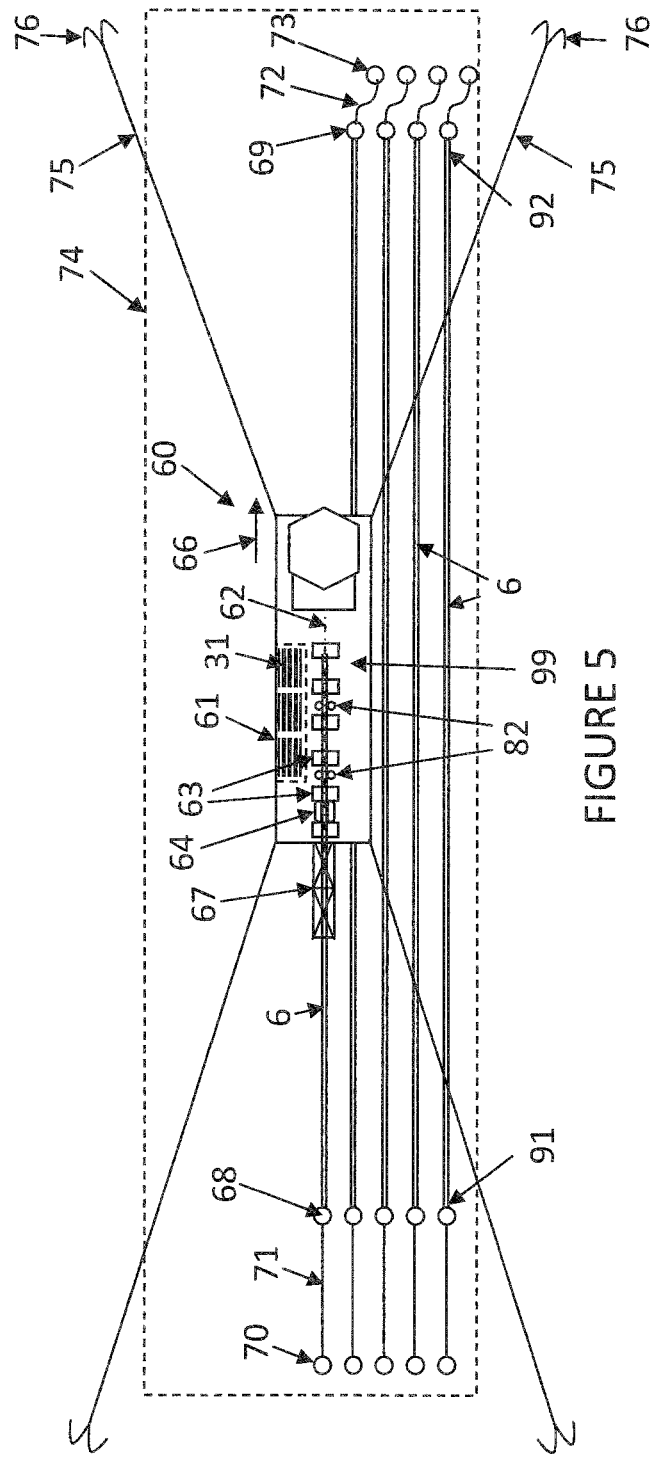

FIG. 4 shows a side view and FIG. 5 a top view of an embodiment of a pipeline constructing vessel 60 constructing sections of pipeline 6 by interconnecting pipe sections 31. Four sections of pipeline 6 are positioned on the underwater storage surface 74. The pipeline constructing vessel 60 is constructing a fifth section of pipeline 6. The pipeline construction vessel 60 is constructed and arranged to position the constructed section of pipeline 6 on the underwater storage surface 74. The pipeline construction vessel 60 comprises a pipeline guide 67 to guide the section of pipeline 6 to the underwater storage surface 74. The pipeline guide 67 is an S-lay stinger. The section of pipeline 6 is constructed and positioned on the underwater storage surface 74 by an S-lay procedure. The pipeline construction vessel 60 is an S-lay vessel.

The sections of pipeline 6 are temporarily stored on the underwater storage surface 74. During the period that the sections of pipeline 6 are stored on the underwater storage surface 74, the sections of pipeline 6 are not used to transport a fluid, more specifically a hydrocarbon fluid.

The sections of pipeline 6 comprise a first end 91 and a second end 92. The first end 91 is constructed before the second end 92. A connector 70 located in a fixed position relative to the underwater storage surface 74 is provided. The first end 91 of the section of pipeline 6 is connected to the connector 70 during the construction of the section of the pipeline 6. The first end 91 is connected to the connector 70 during the period that the completed section of the pipeline 6 is positioned on the underwater storage surface 74.

The connector 70 is located on the underwater storage surface 74. In other examples, the connector 70 is located on a quay or on-shore near a coast line.

The first end 91 and second end 92 are sealed in a watertight manner such that the inside of the section of pipeline 6 is not filled with liquid, more specifically sea water 8, when positioned on the underwater storage surface 74. A first sealing member 68 is connected in a watertight manner to the first end 91 and a second sealing member 69 is connected in a watertight manner to the second end 92. A buoy 73 is connected to the second end 92 of the section of pipeline 6, more specifically to the second sealing member 69.

When positioned on the underwater storage surface 74, the sections of pipeline 6 are completely located under water. The underwater storage surface 74 is formed by the seabed 9. In other examples, the under water storage surface 74 may be formed by a support structure provided on the seabed 9.

When the underwater storage surface 74 is chosen in shallow water and at a sheltered location, the sections of pipeline 6 can be effectively constructed with a low cost pipeline construction vessel, for instance an S-lay unit. Such an S-lay unit can be a conventional S-lay vessel with a number of workstations along the pipelay firing line and a small stinger or a cargo barge with a temporary firing line and a number of temporary workstations and a temporary short stinger or otherwise.

In the embodiment shown, each section of pipeline 6 is connected to a different connector 70. In other examples, a single connector 70 may be used for multiple sections of pipeline 6. The connectors 70 can be a driven pile, a suction pile, a deadweight or otherwise. A first elongate flexible member 71, such as a cable or chain, connects the first sealing member 68 to the connector 70. The first sealing member 68 closes off the first end 91 of the section of pipeline 6 under construction, so that the inside of said section of pipeline 6 remains dry.

For constructing a section of pipeline 6, pipe sections 31 are brought from the pipe section storage 61 into the S-lay firing line 62. The S-lay firing line 62 may comprise a series of workstations 63 at mutual distances equal to the length of the pipe sections 31; pipe moving means 64; pipe guidance and support means 82; and an S-lay stinger 67.

During construction of the section of pipeline 6 in each of the workstations 63 a part of the construction process is carried out. Said construction process comprises; lining up a new pipe section 31 with the partly constructed section of pipeline 6; welding the new pipe section 31 to the partly constructed section of pipeline 6; inspecting the weld; and coating the weld zone. Each time a connection of the pipe section 31 to the partly constructed section of pipeline 6 is completed in the last workstation 63, the pipeline construction vessel 60 is moved forward in the direction of arrow 66 over the length of the pipe section 31 and the process in each workstation is repeated. The pipeline construction vessel 60 is moved forward either on a dynamic positioning system (not drawn) or on a system of anchor wires 75 running to anchors 76 embedded in the seabed 9 outside the underwater storage surface 74. The anchoring system keeps the partly constructed pipeline 6 under tension such that it forms a gentle S-shaped catenary from the vessel deck 99 over the S-lay stinger 67 through the water 8 to the underwater storage surface 74, without overstressing the section of pipeline 6 under construction.

Once the section of pipeline 6 is at the desired length, a second sealing member 69 is welded to the second end 92 of the section of pipeline 6. The second sealing member 69 head closes off the section of pipeline 6 so that it stays dry inside when the second end 92 is laid down on the underwater storage surface 74. Before the second end 92 is laid down, a second elongate flexible member 72, such as a cable or chain, is connected to the second sealing member 69 and the recovery buoy 73 is connected to the other end of the second elongate flexible member 72. The buoy 73 stays afloat on the water surface 77 and makes it easy to find back the end of the second elongate flexible member 72 for later recovery of the sections of pipeline 6 stored on the underwater storage surface 74.

Figure 6:
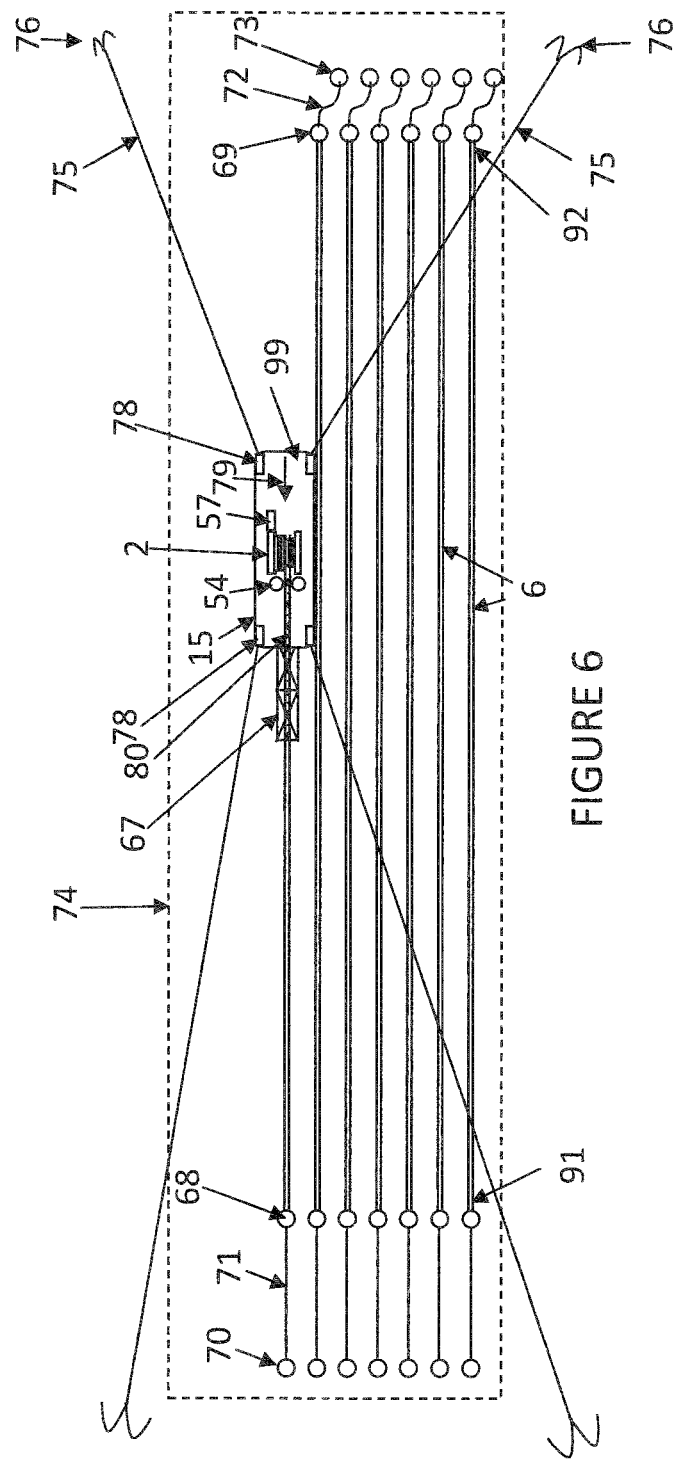
Figure 7:
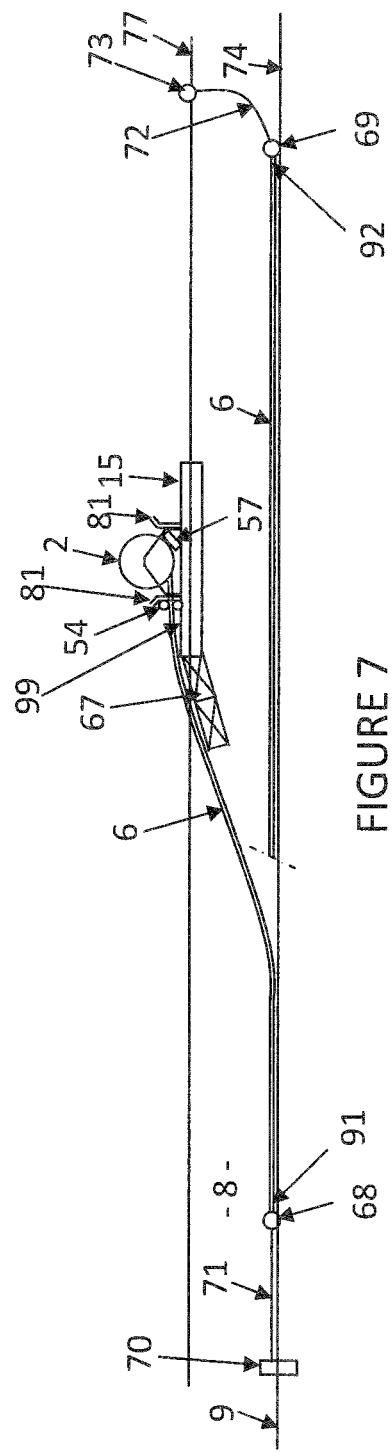

FIG. 6 shows a top view and FIG. 7 a side view of an embodiment of a vessel 15 recovering a section of pipeline 6 from the underwater storage surface 74 and spooling the section of pipeline 6 on a reel 2. For spooling a section of pipeline 6 stored on the underwater storage surface 74 onto the reel 2, a vessel 15 supporting the reel 2 is brought in the required position near said section of pipeline 6. The vessel 15 can be a pipeline laying vessel 1 with a fixed reel 2 as shown in FIG. 1 or a pipeline laying vessel 1 with at least one removable reel 2 as shown in FIG. 2 or a transport vessel for shuttling removable reels 2 between the underwater storage surface 74 and a pipeline laying vessel 1 with removable reels 2, which pipeline laying vessel 1 is located at the off-shore location where the pipeline needs to be installed or where the free end of the pipeline is located.

The vessel 15 has a firing line 80 comprising a pipeline guide 67, pipe support and a pipe fleeting device 54; moreover, the vessel 15 has a reel 2 aligned with the firing line 80 and a reel drive unit 57 for driving the reel 2. The vessel 15 is equipped with an anchoring system for moving the vessel 15 in the direction of arrow 79. The anchoring system comprises anchor winches 78, anchor wires 75 and anchors 76 embedded in the seabed 9 outside the underwater storage surface 74. In other examples, the vessel 15 is provided with a dynamic positioning system.

For recovering a section of pipeline 6 stored on the underwater storage surface 74 and spooling it on a reel 2, a recovery buoy 73 is picked up out of the water 8 and the second elongate flexible member 72 is led into the firing line 80 over the pipeline guide 67, detached from the recovery buoy 73 and connected to the reel 13. Subsequently, the second elongate flexible member 72 is wound on to the reel 2 using the reel drive unit 57 and the anchoring system tensioned using the anchor winches 78 until the section of pipeline 6 with second sealing member 69 is recovered into the firing line 80. The section of pipeline 6 extends from the underwater storage surface 74 over the pipeline guide 67 to the deck 99 of the vessel 15 in a gentle S-shaped catenary.

When the second sealing member 69 has reached the reel 2, it is fixed to the reel 2 and subsequently, the rest of the section of pipeline 6 is spooled onto the reel 2. The section of pipeline 6 is kept under back-tension by counteracting forces exerted by the reel drive unit 57 and the anchor winches 78, whilst moving forward in the direction of arrow 79. Once the first sealing member 68 has reached the reel 2, the section of pipeline 6 on the reel 2 is kept under back-tension by the first elongate flexible member 71 which is connected to the connector 70. The first sealing member 61 is then firmly secured to the reel 2, such that the section of pipeline 6 on the reel 2 is permanently kept under back-tension. Finally, the first elongate flexible member 71 is released from the first sealing member and returned to the seabed 9 or recovered.

When the vessel 15 is equipped with a dynamic positioning system instead of an anchoring system, the forward thrust is exerted by the dynamic positioning system instead of by the anchor winches 78.

It is also possible that the reel 2 is filled with multiple interconnected sections of pipeline 6. This can be done by before transporting the reel 2 to the off-shore location, recovering a further section of pipeline 6 from the underwater storage surface 74, connecting the further section of pipeline 6 to the already spooled section of pipeline 6 and spooling the further section of pipeline 6 on the reel 2. The reel 2 holding the interconnected sections of pipeline 6 is transported to the off-shore location where the free end 98 of the pipeline 100 is located. The interconnected sections of pipeline 6 are at the off-shore location connected to the free end 98 of the pipeline 100 and lowered to the seabed 9. It is of course also possible to interconnect more than two sections of pipeline 6, or to spool two or more separate sections of pipeline 6 onto a single reel 2 without interconnecting them, or by using a temporary connection which is released when one of the sections of pipeline 6 is lowered to the seabed 9.

Figure 8:
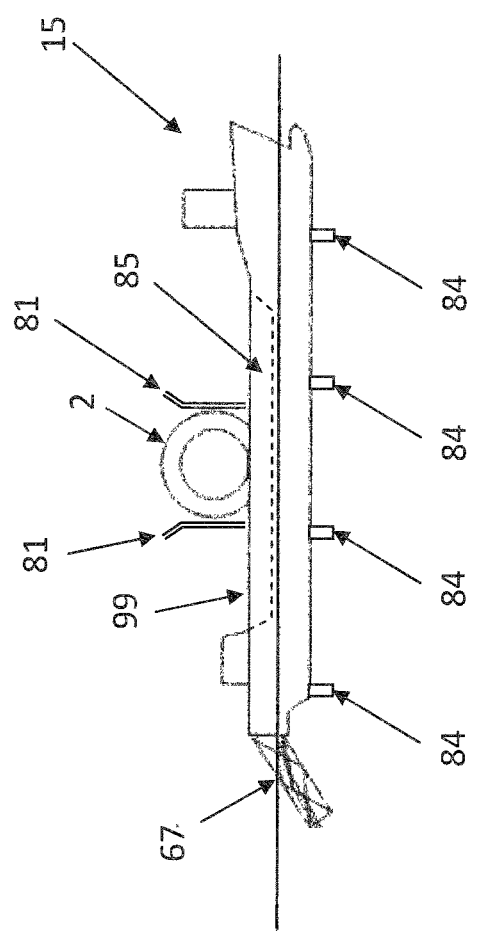

When the vessel 15 is a transport vessel for removable reels 2, the reels 2 are placed between guide posts 81, such that the reel 2 can be removed, such as lifted, from its position on the vessel 15 using the crane 11 of the pipeline laying vessel 1 and an empty reel 2 can be placed back in the same position. The transport vessel can be a cargo barge towed by one or more tugs or a self-propelled reel transport vessel (as shown in FIG. 8) transporting the reel 2 on its deck 99.

The use of the underwater storage surface 74 makes it possible to construct and store very long sections of pipeline 6. There are many shallow waters wherein the seabed can serve as a very large naturally formed underwater storage surface.

The length of the stored sections of pipeline 6 can be made several kilometers long, preferably to a length equal to the maximum length that can be held by the reel 2, so that it is not required to interconnect sections of pipeline 6 when filling the reel 2. This eliminates the time required to make interconnections of sections of pipeline 6 when filling the reel 2. In the situations that interconnections of sections of pipeline 6 are required to fill the reel 2, the number of interconnections are reduced by the long sections of pipeline 6. Due the this, less time is required to fill the reel 2, which results in cost savings.

Due to the use of the underwater storage surface 74, it is also not required to have an large on-shore storage area. Such large storage areas are very expensive to build and there are not many locations suitable for such a large storage area.

FIG. 9 shows the situation in which the vessel 15 has transported the reel 2 holding the section of pipeline 6 to an off-shore location where a free end 98 of the pipeline 100 is located. The free end 98 of the pipeline 100 is suspending from a pipeline laying vessel 1. The reel 2 holding the section of pipeline 6 will be transferred from the vessel 15 to the pipeline laying vessel 1 by the crane 11 provided on the pipeline laying vessel 1. In other examples, the transferring of the reel 2 holding the section of pipeline 6 is performed by a reel guiding system, such as a skidding system, extending between the vessel 15 and the pipeline laying vessel 1.

In other examples, the section of pipeline 6 is transferred without transferring the reel 2. The transferring of the section of pipeline 6 is performed by spooling said section of pipeline 6 from the reel 2 of the vessel 15 onto the reel 2 provided on the pipeline laying vessel 1.

The section of pipeline 6 transferred to the pipeline laying vessel 1 will be connected to the free end 98 of the pipeline 100 held by the pipeline laying vessel 1. Subsequently, the interconnected section of pipeline 6 and pipeline 100 will be lowered to the seabed 9. Once the section of pipeline 6 is connected to the pipeline 100 and lowered to the seabed 9, it forms part of the pipeline 100.

After that, the empty reel 2 will be transferred from the pipeline laying vessel 1 to the vessel 15. The vessel 15 will sail back to the underwater storage surface 74 to recover a new section of pipeline 6 from the under water storage surface 74 and to spool said section of pipeline 6 on the empty reel 2. As indicated, it is also possible that multiple interconnected sections of pipeline 6 are spooled on the reel 2.

The reel 2 holding the new section of pipeline 6 will be transported by the vessel 15 to the pipeline laying vessel 1 holding the free end 98 of the pipeline 100. Said new section of pipeline 6 is connected to the free end 98 of the pipeline 100 and lowered to the seabed 9. This is repeated until the pipeline 100 has the desired length.

It is also possible that multiple reels 2 filled with sections of pipeline 6 are transported at the same time to the pipeline laying vessel 1 holding the free end 98 of the pipeline 100.

The pipeline laying vessel 1 is a reel-lay vessel. The interconnected section of pipeline 6 and pipeline 100 are lowered to the seabed 9 by a reel-lay procedure.

The pipeline laying vessel 1 is constructed and arranged to lower the interconnected section of pipeline 6 and pipeline 100 to the seabed 9 by a reel-lay procedure.

The following clauses define embodiments of the method according to the invention.

1. Method of laying a pipeline on a seabed, said method comprising the steps of;

constructing a section of pipeline by interconnecting pipe sections, positioning the section of pipeline on an underwater storage surface, and recovering the section of pipeline from the under water storage surface and spooling the section of pipeline on a reel provided on a vessel.

2. Method according to clause 1, wherein the method comprises transporting the reel holding the section of pipeline to an off-shore location where the section of pipeline is lowered to the seabed.

3. Method according to clause 2, wherein the method comprises before transporting the reel to the off-shore location constructing a further section of pipeline and positioning the further section of pipeline on the underwater storage surface, recovering the further section of pipeline from the underwater storage surface, connecting the further section of pipeline to the spooled section of pipeline and spooling the further section of pipeline on the reel, and wherein the interconnected section of pipeline and further section of pipeline at the off-shore location are lowered to the seabed.

4. Method according to clause 1, wherein the method comprises:
  transporting the reel holding the section of pipeline to an off-shore location where a free end of the pipeline is located,
  connecting the section of pipeline to the free end of the pipeline, and
  lowering the interconnected section of pipeline and pipeline to the seabed.

5. Method according to clause 4, wherein the method comprises before transporting the reel to the off-shore location constructing a further section of pipeline and positioning the further section of pipeline on the underwater storage surface, recovering the further section of pipeline from the underwater storage surface, connecting the further section of pipeline to the spooled section of pipeline and spooling the further section of pipeline on the reel, and wherein the interconnected section of pipeline and further section of pipeline at the off-shore location are connected to the free end of the pipeline and lowered to the seabed.

6. Method according to any of the preceding clauses, wherein the length of the constructed section of pipeline is equal to the maximum length that can be held by the reel.

7. Method according to any of the preceding clauses, wherein the section of pipeline is positioned on the underwater storage surface to temporarily store the section of pipeline.

8. Method according to any of the preceding clauses, wherein the method comprises lowering the section of pipeline to the seabed by unspooling the section of pipeline from the reel.

9. Method according to any of the preceding clauses, wherein the method comprises transporting the reel holding the section of pipeline from the underwater storage surface to the off-shore location with the vessel.

10. Method according to any of the preceding clauses, wherein the method comprises constructing the section of pipeline with a pipeline construction vessel.

11. Method according to clause 10, wherein the method comprises positioning the section of pipeline on the underwater storage surface with the pipeline construction vessel.

12. Method according to clause 10 or 11, wherein the pipeline construction vessel is constructed and arranged to position the constructed section of pipeline on the underwater storage surface.

13. Method according to any of the clauses 10-12, wherein the pipeline construction vessel comprises a pipeline guide to guide the section of pipeline to the underwater storage surface.

14. Method according to clause 13, wherein the pipeline guide is an S-lay stinger.

15. Method according to any of the preceding clauses, wherein the method comprises constructing the section of pipeline and positioning the section of pipeline on the underwater storage surface by an S-lay procedure.

16. Method according to any of the clauses 10-15, wherein the pipeline construction vessel is an S-lay vessel.

17. Method according to any of the preceding clauses, wherein the method comprises transferring the reel holding the section of pipeline from the vessel to a pipeline laying vessel and lowering the section of pipeline to the seabed with the pipeline laying vessel.

18. Method according to clause 17, wherein the transferring of the reel holding the section of pipeline is performed by lifting said reel with a crane.

19. Method according to clause 18, wherein the crane is provided on the vessel.

20. Method according to clause 18, wherein the crane is provided on the pipeline laying vessel.

21. Method according to clause 17, wherein the transferring of the reel holding the section of pipeline is performed by a reel guiding system extending between the vessel and the pipeline laying vessel.

22. Method according to any of the preceding clauses, wherein the method comprises transferring the section of pipeline from the vessel to a pipeline laying vessel and lowering the section of pipeline to the seabed with the pipeline laying vessel.

23. Method according to clause 22, wherein the transferring of the section of pipeline is performed by spooling said section of pipeline from the reel of the vessel onto a further reel provided on the pipeline laying vessel.

24. Method according to clause 23, wherein the method comprises lowering the section of pipeline to the seabed while unreeling the further reel.

25. Method according to any of the preceding clauses, wherein the method comprises lowering the section of pipeline to the seabed with a pipeline laying vessel.

26. Method according to any of the preceding clauses, wherein the method comprises lowering the section of pipeline to the seabed by a reel-lay procedure.

27. Method according to clause 25 or 26, wherein the pipeline laying vessel is a reel-lay vessel.

28. Method according to any of the preceding clauses, wherein the vessel is a transport vessel.

29. Method according to clause 28, wherein the transport vessel is a cargo barge.

30. Method according to clause 28 or 29, wherein the transport vessel is a self-propelled vessel.

31. Method according to any of the clauses 1-27, wherein the vessel is a pipeline laying vessel.

32. Method according to any of the clauses 17-31, wherein the pipeline laying vessel comprises at least one fixed reel.

33. Method according to clause 31 or 32, wherein the method comprises transporting the reel holding the section of pipeline from the underwater storage surface to the off-shore location with the pipeline laying vessel.

34. Method according to any of the clauses 17-33, wherein the pipeline laying vessel comprises at least one removable reel.

35. Method according to any of the preceding clauses, wherein
  the section of pipeline comprises a first end and a second end,
  the first end is constructed before the second end, and
  the method comprises providing a connector located in a fixed position relative to the underwater storage surface and connecting the first end of the section of pipeline to the connector.

36. Method according to clause 35, wherein the first end is connected to the connector during the construction of the section of the pipeline.

37. Method according to any of the clauses 35-36, wherein the first end is connected to the connector during the period that the section of the pipeline is positioned on the underwater storage surface.

38. Method according to any of the clauses 35-37, wherein the first end is connected to the connector during the recovery of the section of pipeline from the under water storage surface and the spooling of the section of pipeline on the reel.

39. Method according to any of the clauses 35-38, wherein the connector is located on the underwater storage surface.

40. Method according to any of the clauses 35-39, wherein the connector is located on a quay.

41. Method according to any of the clauses 35-40, wherein multiple sections of pipeline are connected to one connector.

42. Method according to any of the clauses 35-41, wherein the method comprises watertight sealing the first end and second end such that the inside of the section of pipeline is not filled with liquid when positioned on the underwater storage surface.

43. Method according to any of the clauses 35-42, wherein the method comprises connecting a buoy to the second end.

44. Method according to any of the clauses 35-43, wherein the second end is recovered from the underwater storage surface and spooled on the reel before the first end.

It will be apparent to those skilled in the art that various modifications can be made to the method without departing from the scope as defined in the claims.

The invention claimed is:

1. A method of spooling a pipeline onto a reel, said method comprising the steps of;
   constructing a section of pipeline by interconnecting pipe sections using a vessel,
   positioning the section of pipeline on an underwater storage surface separate from the vessel, and subsequently
   recovering the section of pipeline from the underwater storage surface and spooling the section of pipeline onto the reel provided on the same or a different vessel.

2. The method according to claim 1, wherein the method comprises transporting the reel holding the section of pipeline to an off-shore location where the section of pipeline is lowered to the seabed.

3. The method according to claim 2, wherein the method comprises before transporting the reel to the off-shore location constructing a further section of pipeline and positioning the further section of pipeline on the underwater storage surface, recovering the further section of pipeline from the underwater storage surface, connecting the further section of pipeline to the spooled section of pipeline and spooling the further section of pipeline on the reel, and wherein the interconnected section of pipeline and further section of pipeline at the off-shore location are lowered to the seabed.

4. The method according to claim 1, wherein the method comprises:
   transporting the reel holding the section of pipeline to an off-shore location where a free end of the pipeline is located,
   connecting the section of pipeline to the free end of the pipeline, and
   lowering the interconnected section of pipeline and pipeline to the seabed.

5. The method according to claim 4, wherein the method comprises before transporting the reel to the off-shore location constructing a further section of pipeline and positioning the further section of pipeline on the underwater storage surface, recovering the further section of pipeline from the underwater storage surface, connecting the further section of pipeline to the spooled section of pipeline and spooling the further section of pipeline on the reel, and wherein the interconnected section of pipeline and further section of pipeline at the off-shore location are connected to the free end of the pipeline and lowered to the seabed.

6. The method according to claim 1, wherein the method comprises constructing the section of pipeline with a pipeline construction vessel.

7. The method according to claim 1, wherein the method comprises constructing the section of pipeline and positioning the section of pipeline on the underwater storage surface by an S-lay procedure.

8. The method according to claim 1, wherein the method comprises transferring the reel holding the section of pipeline from the vessel to a pipeline laying vessel and lowering the section of pipeline to the seabed with the pipeline laying vessel.

9. The method according to claim 8, wherein the transferring of the reel holding the section of pipeline is performed by lifting said reel with a crane.

10. The method according to claim 8, wherein the pipeline laying vessel comprises at least one fixed reel.

11. The method according to claim 10, wherein the method comprises transporting the reel holding the section of pipeline from the underwater storage surface to the off-shore location with the pipeline laying vessel.

12. The method according to claim 8, wherein the pipeline laying vessel comprises at least one removable reel.

13. The method according to claim 1, wherein the method comprises transferring the section of pipeline from the vessel to a pipeline laying vessel and lowering the section of pipeline to the seabed with the pipeline laying vessel.

14. The method according to claim 1, wherein the method comprises lowering the section of pipeline to the seabed with a pipeline laying vessel.

15. The method according to claim 1, wherein the vessel is a transport vessel.

16. The method according to claim 15, wherein the transport vessel is a cargo barge.

17. The method according to claim 1, wherein
    the section of pipeline comprises a first end and a second end,
    the first end is constructed before the second end, and
    the method comprises providing a connector located in a fixed position relative to the underwater storage surface and connecting the first end of the section of pipeline to the connector.

18. The method according to claim 17, wherein the first end is connected to the connector during the construction of the section of the pipeline.

19. The method according to claim 17, wherein multiple sections of pipeline are connected to one connector.

20. The method according to claim 17, wherein the second end is recovered from the underwater storage surface and spooled on the reel before the first end.

21. A method of laying a pipeline on a seabed, said method comprising the steps of:
    constructing a section of pipeline by interconnecting pipe sections using a vessel,
    positioning the section of pipeline on an underwater storage surface separate from the vessel, and subsequently
    recovering the section of pipeline from the underwater storage surface,
    spooling the section of pipeline onto a reel provided on the same or a different vessel, and
    lowering the section of pipeline from the reel to the seabed.

* * * * *